Figure 3:
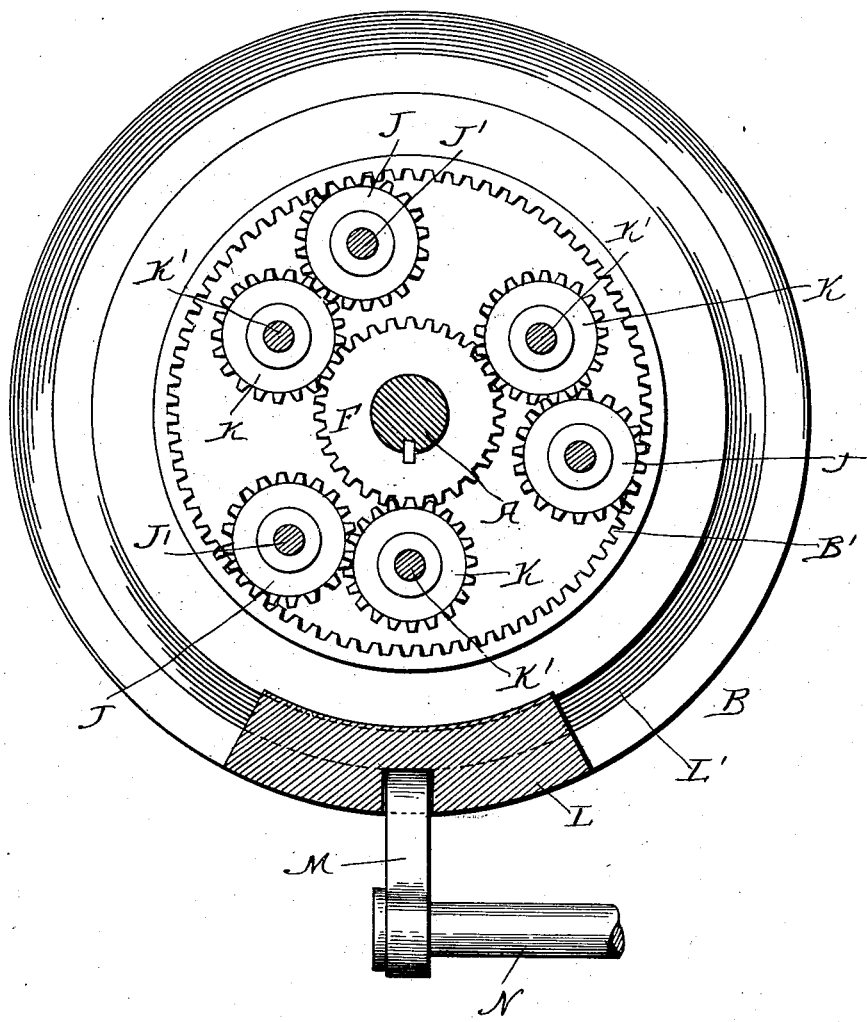

No. 740,128. PATENTED SEPT. 29, 1903.
W. A. HARVEY.
POWER TRANSMISSION DEVICE.
APPLICATION FILED MAY 9, 1903.
NO MODEL. 2 SHEETS—SHEET 1.
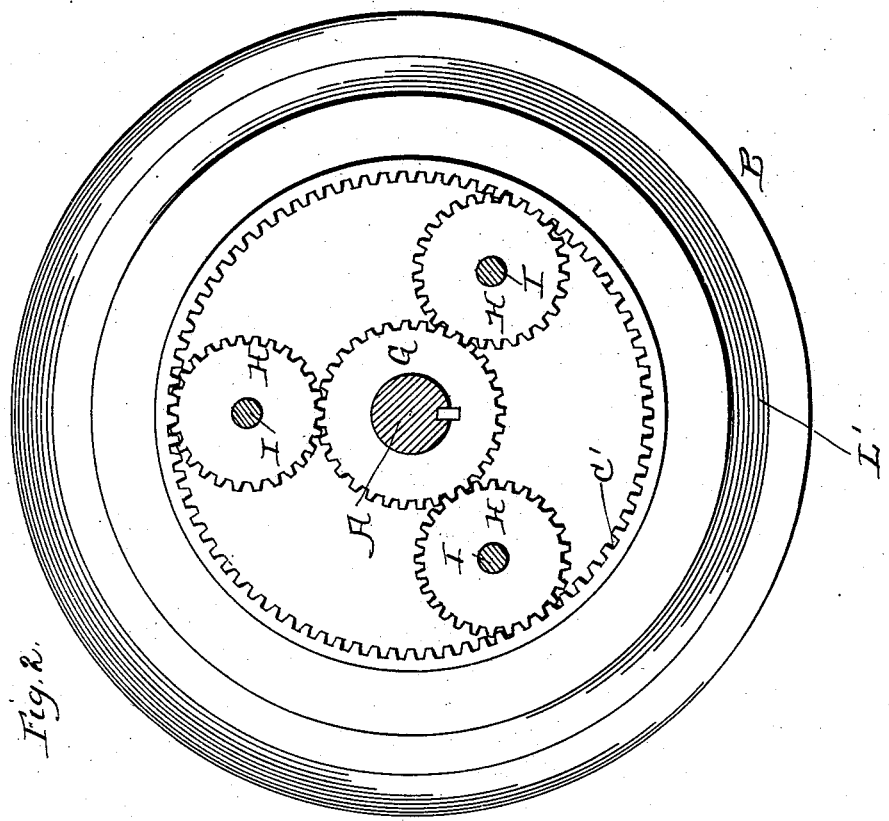
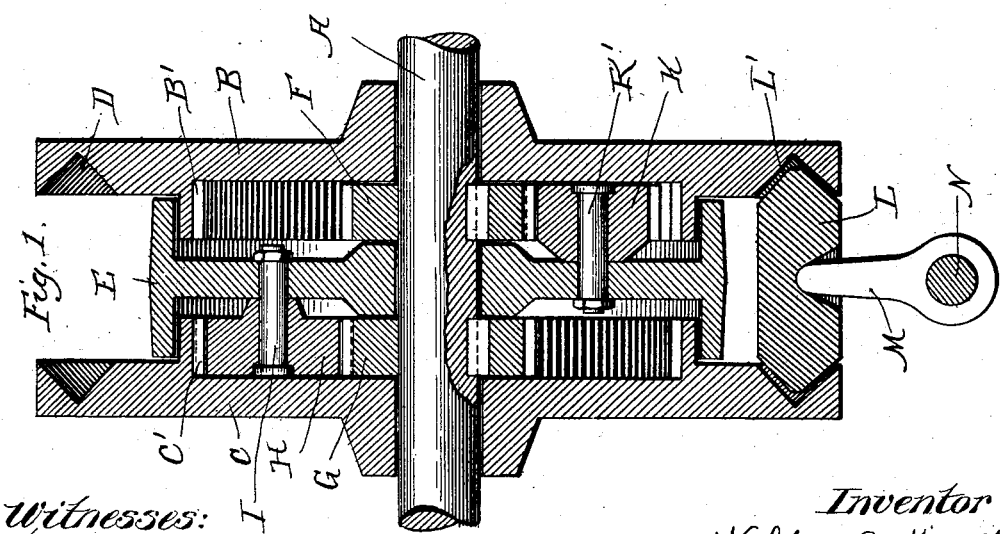
Witnesses:
Louis D. Heinrichs
H. B. Hallock
Inventor
Walter A. Harvey
By
Atty.

No. 740,128. PATENTED SEPT. 29, 1903.
W. A. HARVEY.
POWER TRANSMISSION DEVICE.
APPLICATION FILED MAY 9, 1903.
NO MODEL. 2 SHEETS—SHEET 2.

Witnesses:
Louis D. Heinrichs
H. B. Hallock

Inventor
Walter A. Harvey
By

No. 740,128. Patented September 29, 1903.

UNITED STATES PATENT OFFICE.

WALTER A. HARVEY, OF BATTLECREEK, MICHIGAN.

POWER-TRANSMISSION DEVICE.

SPECIFICATION forming part of Letters Patent No. 740,128, dated September 29, 1903.

Application filed May 9, 1903. Serial No. 156,345. (No model.)

*To all whom it may concern:*

Be it known that I, WALTER A. HARVEY, a citizen of the United States, residing at Battlecreek, county of Calhoun, and State of Michigan, have invented a certain new and useful Improvement in Power-Transmission Devices, of which the following is a specification.

My invention relates to a new and useful improvement in transmission-gears for machinery, and has for its object to provide a simple device which will be compact in form and easily operated.

With this end in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a longitudinal section through my improved device, showing the same in its neutral position; Fig. 2, a face view of the gearing upon one side of the pulley, and Fig. 3 a face view of the gearing upon the opposite side of the pulley.

This transmission device may be applied to any form of machinery, but is particularly applicable to printing-presses and machinery of like nature and can also be applied advantageously to motor-driven vehicles.

A represents the driven shaft, upon which are journaled loosely the friction-wheels B and C. These wheels have upon their inner face, near their periphery, the double-beveled frictional surface D, and each of these friction-wheels B and C have upon their inner face the internal gear-teeth B' and C'.

E is a pulley journaled loosely upon the shaft A and interposed midway between the friction-wheels B and C.

F and G are gear-wheels keyed to the shaft A, one upon each side of the hub of the pulley E, and interposed between the pulley and the friction-wheels B and C.

H represents the gear-wheels arranged upon one side of the pulley between the pulley and the friction-wheel C. These gear-wheels H are journaled upon studs I, secured to and extending outward from the web of the pulley E, and these gear-wheels H mesh with the internal gear C' of the friction-wheel C and also with the gear-wheel G. Upon the other side of the pulley are arranged gears J, which are journaled upon studs J', carried by the pulley, and these gear-wheels J mesh with the internal gear B' of the friction-wheel B. K represents another series of gear-wheels, also journaled on studs K', carried by the pulley E, and these gear-wheels K are in mesh with the gear-wheels J and also with the gear-wheel F.

L is a friction-block interposed between the double-beveled surfaces D upon the friction-wheels B and C, and this friction-block is provided with frictional beveled surfaces L' to correspond to the beveled surfaces D, and this block is designed to be moved laterally by any suitable means or mechanism, here shown as an arm M, which extends upward into a recess in the block, and this arm M is pivoted upon a shaft N, which may be rocked automatically or by means of a hand lever or wheel. Of course it is understood that the pulley E is adapted to be driven by means of a belt passing around the pulley, or it will be understood that instead of a pulley this might be an externally-geared wheel gearing into another power-wheel, or it might be a sprocket-wheel and be driven by a chain.

The operation of my device is as follows: When the friction-block L is midway between the friction-wheels B and C, and thus in a neutral position, as shown in Fig. 1, the pulley E on being revolved will upon one side carry the gear-wheels H around with it, and these gear-wheels H will travel around the gear G, revolving the friction-wheel C, and thus communicate no motion to the shaft A, and upon the other side of the pulley the pulley will carry around with it the gear-wheels L and K, which will revolve around the gear-wheel F, which gear-wheel will remain stationary and the friction-wheel B will revolve with the pulley, and thus no motion will be communicated to the shaft A upon this side; but if the friction-block is brought into frictional contact with the friction-pulley C, so as to cause the same to remain stationary, then the pulley in revolving will carry around with it the gear-wheels H, and these gear-wheels being in mesh with the internal gear C' of the friction-wheel C, which is stationary, will be revolved upon the studs I and communicate the motion to the gear-wheel G and from there to the shaft A, driving said shaft in one direction. Then if the friction-block L is moved into frictional contact with the friction-wheel B, so as to cause the same to remain stationary, the pulley E in revolving will carry with it the gear-wheels J and K, and the gear-wheels J by being in mesh with the internal gear B' will be caused to revolve upon its axis and in turn will impart this motion to the gear-wheels K, which will also be caused to revolve upon their axes, which in turn will impart motion to the gear-wheel F and from there to the shaft A, driving said shaft in the opposite direction. Thus it will be seen that by a slight movement of the friction-block L the mechanism can be reversed and the apparatus makes a very effectual brake, for if the shaft is traveling in one direction it is only necessary to bring the friction-block L into contact with the opposite friction-wheel with a gradual increasing pressure, which will have a tendency to reverse the mechanism, and therefore will gradually slow down the machinery, and as soon as the machinery is brought to a full stop then the block L can be moved to a neutral position, as shown in Fig. 1.

The great advantage of this transmission-gear is that in passing from the forward to the reversed movement the friction-block must pass from one friction-wheel to a neutral position before it reaches the other friction-wheel, and thus there is no danger of starting the reversed movement before the clutch is released from the forward movement.

Of course I do not wish to be limited to the exact construction here shown, as slight modifications could be made without departing from the spirit of my invention.

Having thus fully described my invention, what I claim as new and useful is—

1. In a power-transmission device, a driven shaft, friction-wheels journaled loosely upon said driven shaft, a driven wheel interposed midway between the friction-wheels, gear-wheels secured to the driven shaft and arranged upon each side of the driving-wheel, internal gears formed upon the inner face of each of the friction-wheels, a series of gear-wheels arranged upon one side of the driving-wheel, studs extending outward from the driving-wheel upon which said gears are journaled, each of said gear-wheels being in mesh with the friction-wheel upon that side, and also in mesh with the gear-wheel keyed to the shaft upon that side of the driving-wheel, a series of gear-wheels arranged upon the opposite side of the driving-wheel, studs extending outward from the driving-wheel upon which said gears are journaled, said gears being in mesh with the internal gear upon the friction-gear upon that side of the driving-wheel, a second series of gears upon the same side of the driving-wheel, studs extending outward from the driving-wheel upon which said gears are journaled, said last-named gears being in mesh with the first-named gears and also with the gear-wheel secured to the driving-wheel upon that side, a friction-block arranged between the friction-wheels and means for moving said friction-block in or out of engagement with one or the other of the friction-wheels or causing the same to remain midway between the friction-wheels, as and for the purpose specified.

2. In a device of the character described, a driven shaft, friction-wheels journaled loosely upon said driven shaft, a driving-wheel journaled loosely upon the driven shaft and interposed between the friction-wheels, internal gears formed upon the inner face of the friction-wheels, gear-wheels secured to the driven shaft and arranged upon each side of the driving-wheel, studs carried by said driving-wheel upon one side, gears arranged upon one side of the driving-wheel and journaled upon said studs, said gears meshing with the internal gear of one friction-wheel and one of the gear-wheels journaled upon the driven shaft, studs carried by the driving-wheel upon the opposite side, gears arranged upon the opposite side of the driving-wheel journaled upon said studs, said gears meshing with the internal gear of the opposite friction-wheel, intermediate gears journaled upon studs carried by the driving-wheel meshing with the first-named gears upon that side, and the other gear-wheel secured to the driven shaft, a friction-block interposed between the two friction-wheels and means for moving said friction-block laterally, either into contact with one or the other of the friction-wheels, or causing the same to rest in an intermediate position, as specified.

In testimony whereof I have hereunto affixed my signature in the presence of two subscribing witnesses.

WALTER A. HARVEY.

Witnesses:
A. J. HARVEY,
H. J. JOHNSON.